Jan. 16, 1934.  J. A. THOMAS  1,943,401
VALVE
Filed Feb. 24, 1932   3 Sheets-Sheet 1

Inventor
James A. Thomas
By
His Attorney

Jan. 16, 1934. J. A. THOMAS 1,943,401
VALVE
Filed Feb. 24, 1932 3 Sheets-Sheet 3

Inventor
James A Thomas
By W. H. Caswell
His Attorney

Patented Jan. 16, 1934

1,943,401

UNITED STATES PATENT OFFICE 1,943,401

VALVE

James A. Thomas, Los Angeles, Calif.

Application February 24, 1932. Serial No. 594,766

20 Claims. (Cl. 137—139)

This invention relates to a valve and relates more particularly to a needle valve for controlling the flow of fluid through large fluid conductors such as water mains, aqueduct lines, and the like.

It is a general object of the invention to provide a simple, practical and improved needle valve for controlling the flow through a large fluid conductor that utilizes the head or fluid pressure in the conductor to operate the closure member or valve plug.

It is another object of the invention to provide a valve of the character mentioned that embodies a single unitary valve plug that is operated or moved as a unit. In valves of the general character provided by this invention, it has been the common practice to employ flow controlling members or valve plugs of telescoping construction that are extremely expensive, and that necessitate very accurate machining and fitting of the parts. The unitary valve plug structure embodied in the present invention is extremely simple and inexpensive of manufacture, and effective in operation.

It is another object of the invention to provide a valve of the character mentioned that includes a novel and improved means for controlling the operation of the valve plug. The present invention provides a particularly simple and effective operating connection between the movable element within the valve and the control or operating means at the exterior of the valve.

It is another object of the invention to provide a valve of the character mentioned in which the flow controlling member or valve plug may be accurately operated to any definite or predetermined position.

It is another object of the invention to provide a valve of the type mentioned that includes a simple practical and improved means for circulating the actuating fluid pressure to and from the cylinder of the valve plug.

It is a further object of the present invention to provide a valve of the character mentioned that includes a simple and effective means for guiding the valve plug for movement between the open and closed positions.

Figure 1:
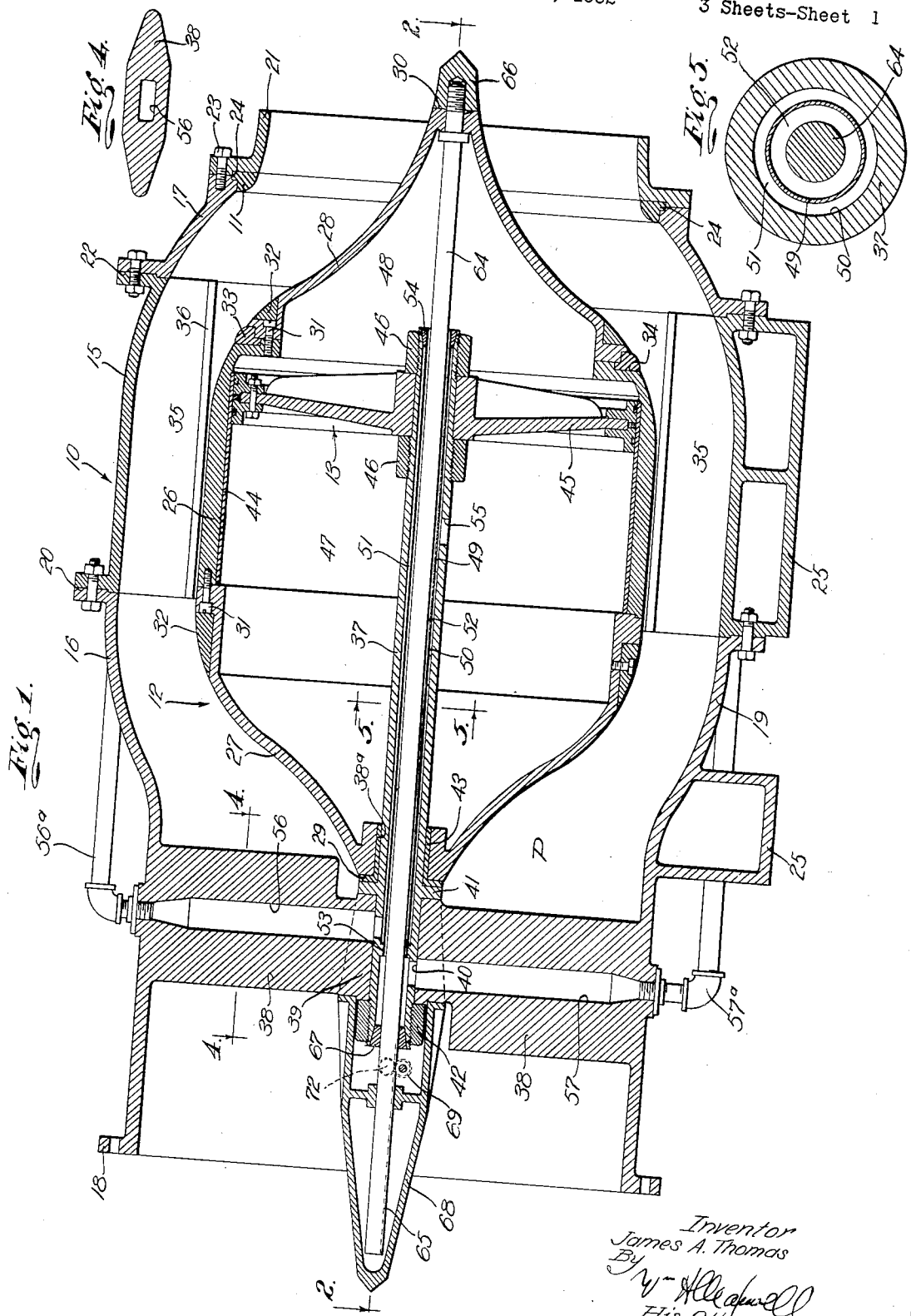
Figure 2:
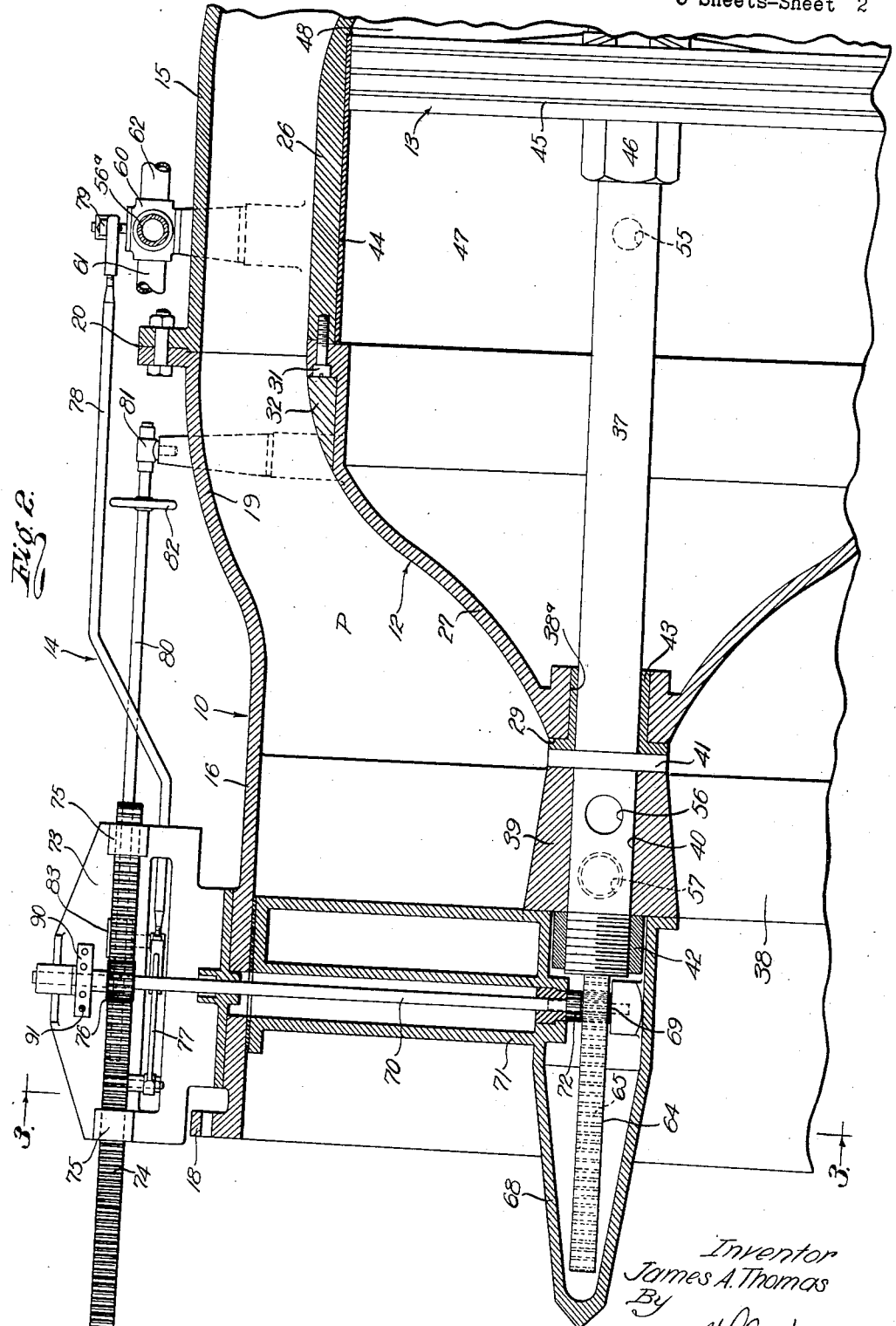
Figure 3:
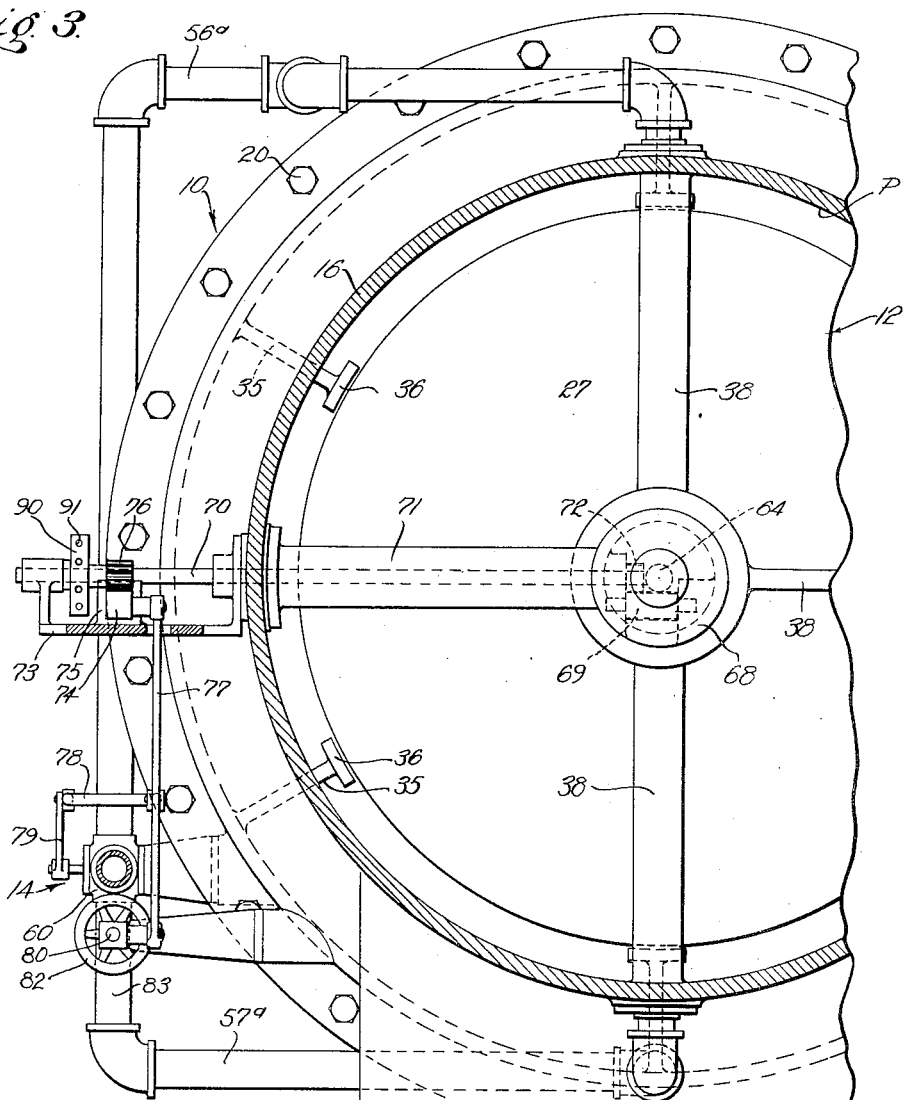
Figure 6:
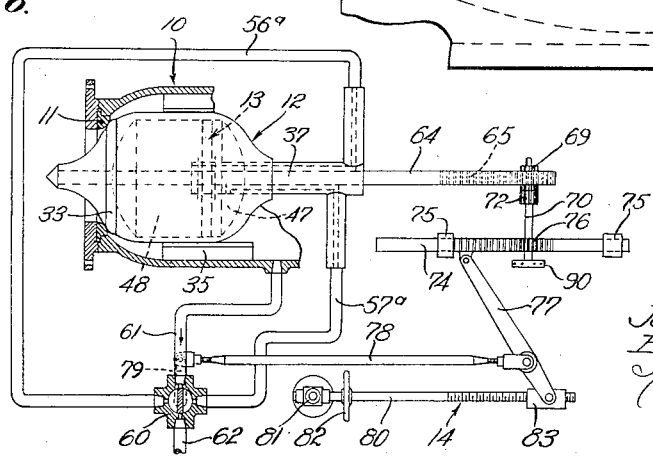

Other objects and features of the invention will be best and more fully understood from the following detailed description of a typical form and application of the invention, throughout which description, reference is had to the accompanying drawings, in which:

Fig. 1 is a central longitudinal detailed sectional view of the valve showing the valve plug in the open position. Fig. 2 is an enlarged fragmentary detailed sectional view taken substantially as indicated by line 2—2 on Fig. 1. Fig. 3 is a fragmentary transverse sectional view taken substantially as indicated by line 3—3 on Fig. 2. Fig. 4 is an enlarged transverse detailed sectional view taken as indicated by line 4—4 on Fig. 1. Fig. 5 is a transverse detailed sectional view taken as indicated by line 5—5 on Fig. 1. Fig. 6 is a diagrammatic view of the principal working parts showing the valve plug in the closed position.

The valve provided by this invention includes, generally, a body 10 adapted to be mounted in a line or fluid conduit, and having a valve seat 11, a valve plug 12 in the body 10 operable between a position in engagement with the seat 11 and an open position free of the seat 11, cylinder and piston means 13 for operating the plug 12 between the open and closed positions, control means 14 for the cylinder and piston means, and various other parts and mechanisms, the functions and details of which will be subsequently described.

The body 10 is an elongate tubular structure adapted to pass or conduct fluid. The body 10 may be constructed for mounting intermediate the ends of the main or conduit, or for mounting at an end of a main or conduit. In the particular case illustrated in the drawings, the body 10 is formed for attachment to the discharge end of a main or pipe, it being understood that the invention is not to be restricted as limited to the particular mounting or manner of mounting the body. The body 10 is sectional, including a central section 15, and end sections 16 and 17. The section 16 at the intake end of the valve is adapted to be connected with the main or conduit, and is provided with suitable means for connecting with the conduit. In the case illustrated in the drawings, a flange 18 is provided at the end of the section 16. The major portion or inner end portion of the section 16 is straight or cylindrical, while the other end portion 19 that connects with the central section 15 is enlarged or outwardly flared. A flange and bolt connection 20 is provided between the inner end section 16 and the central section 15.

The central section 15 is cylindrical in its general configuration, but its outer end is slightly restricted or curved inwardly to connect with the outer end section 17. The outer end section 17 is restricted or tapered inwardly throughout its length, and is provided at its outer end with a discharge nozzle 21. A flange and bolt connection 22 may be provided between the sections 15 and 17, while the nozzle 21 may be attached to the section 17 by bolts 23. The opening or fluid passage P extending through the body 10 is preferably round in cross section, and the enlargements and restrictions of the passage occurring in the sections 16 and 17 are gradual and symmetrical to cause a minimum amount of disturbance and turbulence in the flow through the valve. The valve seat 11 is an annular member having a flange 24 carried or held in a recess between the section 17 and the nozzle 21. The sealing face of the seat 11 may be rounded and is adapted to be engaged by a similar seating face on the plug 12. Bases or mountings 25 may be provided on the end section 16 and the central section 15 to support or carry the body 10.

The plug 12 is movable longitudinally in the fluid passage P between a position where it cooperates with the seat 11 to close the passage, and an open position free of the seat.

In accordance with the invention, the plug 12 is a closed hollow structure disposed longitudinally in the fluid passage P. The plug 12 is sectional, including a central section 26 and end sections 27 and 28. The central section 26 of the plug is cylindrical and is of considerably less diameter than the fluid passage P. The end sections 27 and 28 close the opposite ends of the central section 26 and are stream lined to offer a minimum amount of resistance to the flow through the valve. The inner end section 27 terminates in a shoulder 29 of comparatively small diameter. The outer end section 28 is adapted to extend into and through the end body section 17 and the nozzle 21, and terminates in a comparatively small shoulder 30. The sections 26, 27 and 28 of the plug may be connected by screws 31 whose heads may be covered by rings 32. The exterior of the plug 12 is smooth and regular to offer little skin friction or resistance to the flow of fluid through the passage P.

A sealing ring 33 is provided on the outer end of the plug 12 to cooperate with the seat 11 when the plug is in the closed position. The sealing ring 33 may be held in a recess 34 between the central section 26 and the end section 28 and has a curved sealing face projecting slightly from the exterior of the plug. The invention provides an improved means for centering the plug 12 in the passage P and for guiding the plug for longitudinal movement. A plurality of circumferentially spaced guides 35 are provided on the interior of the central body section 15. The guides 35 extend throughout the entire length of the section 15 and are provided at their inner edges with flanges 36 to slidably carry the plug 12. The inner faces of the flanges 26 are concaved to have effective sliding engagement with the exterior of the middle section 26 of the plug.

The cylinder and piston means 13 is within the hollow plug 12 and is operable to actuate the plug in opposite directions to move it between the open and closed positions. The means 13 includes a tubular piston stem 37 extending into the inner end of the plug 12. The piston stem 37 is co-axial with the central longitudinal axis of the valve and passes through an opening 38ª in the inner end of the plug 12. In accordance with the invention, the piston stem 37 is fixed or stationary and is carried by a spider in the body section 16. The spider includes spaced radial webs 38 extending inwardly from the walls of the section 16 and a central hub 39. The webs 38 are preferably stream lined as illustrated in Fig. 5 of the drawings. An axial opening 40 is provided in the hub 39 through which the piston stem 37 extends. A flange 41 is provided on the stem 37 to engage the outer end of the hub 39 and a nut 42 is provided on the end of the stem 37 to clamp against the other end of the hub. The plug 12 is slidable on the stationary stem 37 and a suitable bushing 43 may be provided in the opening 38ª to slidably pass the stem.

The interior of the hollow plug 12 constitutes a cylinder opening or chamber and a cylinder lining 44 is provided on the inner walls of the central plug section 26. A piston 45 is provided on the stem 37 to have sliding engagement with the liner 44. The piston 45 is clamped between nuts 46 threaded on the stem 37. The stationary piston 45 divides the interior of the hollow plug 12 into two chambers, namely, an inner chamber 47 and an outer chamber 48.

The control means 14 is operable to pass fluid under pressure into and from the cylinder chambers 47 and 48 to provide for the longitudinal movement of the plug 12. The control means 14 is adapted to utilize the pressure on the fluid in the line or conduit L in which the valve is arranged and is such that the plug 12 may be moved or operated to any desired predetermined position with great accuracy to effectively govern the flow through the valve. The control means 14 includes a valved arrangement or means for circulating fluid under presure to and from the chambers 47 and 48, and a valve gear by means of which the circulation of the actuating fluid may be accurately governed or controlled to automatically position the plug 12 in a predetermined position.

The means for circulating the actuating fluid includes a tubular partition 49 extending through the opening 50 in the tubular piston stem 37. The tubular partition 49 divides the opening 50 into an outer passage 51 and an inner passage 52. The inner end of the passage 51 is closed by a shoulder 53 carrying the inner end of the tubular partition 49. A tubular plug 54 supports the outer end of the tubular partition 49. The opening in the tubular plug 54 directly communicates with the inner passage 52 so that the inner passage is in communication with the outer cylinder chamber 48. A port 55 is provided in the walls of the tubular piston stem 37 to put the outer passage 51 in communication with the inner cylinder chamber 47. A fluid passage 56 is provided in one of the webs 38 and communicates with the outer passage 51 at a point within the hub 39. A similar fluid passage 57 is provided in a web 38 to communicate with the inner passage 52. The webs 38 are offset so that the passage 57 communicates with the opening 50 of the tubular stem 37 at a point inward of the shoulder 53.

Fluid conduits 56ª and 57ª extend from the passages 56 and 57 to a four way valve 60. The valve 60 is operable to put either of the conduits 56ª and 57ª into communication with a fluid pressure supply pipe 61 or a waste or discharge pipe 62. The supply or inlet pipe 61 communicates with the conduit or line at a point above the valve and carries the fluid under pressure to the four way valve 60 to be delivered to either the chamber 47 or the chamber 48. It will be apparent how the four way valve 60 may be operated to pass fluid under pressure from the inlet pipe 61 to either of the chambers 47 or 48, and put the other cylinder chamber in communication with the discharge or waste pipe 62. Fluid under pressure delivered to one of the cylinder chambers while the other chamber is open to the waste pipe 62, causes longitudinal movement of the plug 12. For example, if the valve 60 is operated to put the conduit 57a in communication with the supply pipe 61, fluid under pressure is delivered to the chamber 48, while the fluid in the chamber 47 is permitted to discharge through the waste pipe 62. This supplying of fluid pressure to the cylinder chamber 48 causes movement of the plug 12 toward the closed position, and if not interrupted, brings the plug to a position where its sealing ring 33 cooperates with the seat 11 to prevent the flow of fluid through the valve. During operation of the valve plug 12 to the closed position the fluid pressures on its opposite ends are equal so that its movement is not materially hampered or interfered with. During operation of the plug 12 from the closed position to an open position, the differential in fluid pressures in the chamber 47 and on the exterior of the plug, causes the pressure on the walls of the chamber 47 to move the plug. It will be noted that the sealing ring 33 is of considerably less diameter than the central plug section 26 and piston 45, so that an effective differential in pressure is obtained.

As stated above, the control means 14 includes a valve gear for operating the fourway valve 62. The valve gear is located at the exterior of the body 10 and a geared connection is provided between the plug 12 and the valve gear whereby the four way valve 62 is automatically operated to a closed position, that is, a position where the conduits 56a and 57a are closed upon the plug 12 reaching a predetermined or desired position. The said geared connection includes a rod 64 carried by the plug 12. The rod 64 extends completely through the tubular stem 37 and has its forward or outer end attached to the end 28 of the plug. A nut 66 may be threaded on the projecting forward end of the rod 65 to attach the rod to the plug. The rod 64 projects from the inner end of the tubular stem 37 and a tubular plug or bushing 67 may be provided to seal about the rod and close the end of the tubular stem. A shield 68 houses the projecting inner end of the rod 64 and slidably supports the rod.

Rack teeth 65 are provided on the projecting inner end of the rod 64 to mesh with a pinion 69, journalled in the shield 68. A pinion shaft 70 extends through an opening in a web 71. The web 71 extends between the shield 68 and the inner walls of the body section 16, and the pinion shaft 70 has an end projecting into the shield and an end projecting outwardly from the body 10. A pinion 72 is provided on the inner end of the pinion shaft 70 to mesh with the pinion 70. A suitable bracket 73 supports the projecting outer end of the pinion shaft 70 and slidably carries a rack 74. The bracket 73 may include slides 75 for slidably supporting and guiding the rack. A pinion 76 is provided on the projecting outer end of the pinion shaft 70 to mesh with the rack 74.

The valve gear operatively connects the geared connection just described with the fourway valve 60 and provides means for manually controlling or actuating the means 14. A floating lever or link 77 has its upper end pivotally attached to the rack 76. A valve rod 78 is pivotally attached to the floating lever 77 at a point between its ends, and extends to the fourway valve 60. The valve rod 78 is pivotally connected with the operating lever 79 of the valve 60. The means for manually operating or controlling the valve 60 includes a rotatable shaft 80 having one end carried by a swivel mounting 81. A suitable hand wheel 82 is provided for rotating the shaft 80. A travelling nut 83 is threaded on the shaft 80 and the lower end of the floating lever 77 is pivotally connected with the nut 83.

To manually operate the four way valve 60, the shaft 80 is rotated in one direction or the other by means of the hand wheel 82 to cause pivoting of the lever 77 and movement of the valve rod 78. The valve rod 78 moves in the same direction as the travelling nut 83 and operates to open or close the valve 60, depending upon the direction of its movement. When the shaft 80 is rotated a certain extent in one direction, the valve rod 78 through the connection of the travelling nut 83, turns the valve lever 79 and causes fluid under pressure from the inlet 61 to pass into the conduit 57a and through the passages 57 and 52 and to discharge into the outer chamber 48. At the same time, the conduit 56a is put into communication with the waste pipe 62 so that the fluid in the chamber 47 is free to pass out through the waste pipe. The admittance of fluid under pressure to the outer chamber 48 and the passage of fluid from the chamber 47 to the waste pipe 62 causes the plug 12 to be operated from the open to the closed position. The number of turns required to be given to the shaft 80 to cause a certain amount of movement of the plug 12 may be determined or known and the geared connection between the plug 12 reaching a given or definite position determined or brought about by certain manual operation of the shaft 80. Movement of the plug 12 causes the rack and pinions at the inner end of the rod 64 to turn the pinion shaft 70 and thus operate the rack 74. It will be noted that the rack 74 moves in the same direction as the plug 12 and the ratio of the several parts may be such that its movement is equal to that of the plug. Longitudinal movement of the rack 74 causes tilting or pivoting of the floating lever 77 and longitudinal movement of the valve rod 78. The valve rod 78 is thus moved in a direction opposite to that in which it was moved to open the valve 60 and upon the plug 12 reaching a given or predetermined position, the valve 60 is automatically closed or brought to a neutral position, thus limiting or stopping movement of the plug 12. In practice, the valve 60 may be set to allow a certain circulation of fluid from the circulating means and chamber 47 and 48 at all times. It will be apparent how the plug 12 may be operated from the closed position to the open position by turning the shaft 80 in a direction to cause opening of the valve 60 and allow fluid under pressure to pass from the inlet 61 to the conduit 56a and inner chamber 47. The operation of the plug 12 and the automatic closing of the vlave 60 in this instance is similar to that just described.

The invention includes means for manually moving or operating the plug 12 where there is no head or pressure on the valve. A pocket wheel 90 is fixed on the projecting end of the pinion shaft 70 and is provided with a plurality of pockets or openings 91 adapted to receive a suitable tool or lever. The pinion shaft 70 may be turned by means of the wheel 90 to cause longitudinal movement of the plug 12.

It is believed that the features and the operation of the valve provided by the present invention will be readily apparent from the foregoing detailed description. The flow controlling plug 12 may be operated any definite distance to a predetermined position by turning the shaft 80 a certain or given amount. As described above, the turning of the shaft 80 causes opening of the fourway valve 60 to provide for the passage of fluid under pressure into one of the cylinder chambers and the discharge of the fluid from the other chamber and thus provide for the longitudinal movement of the plug 12. The geared connection between the plug 12 and the valve gear automatically closes the fourway valve 60 to a neutral position upon the plug reaching a given position determined by the amount of turning of the shaft 80. The guide flanges 36 effectively guide the plug 12 so that the piston 45 and other parts of the device are not subjected to undesirable twisting strains, etc. The plug 12 is very simple and inexpensive of manufacture, and does not embody any telescoping sections, or the like. The liner 44 and the piston 45, which have accurate fits, are the only large parts that require careful, accurate machining, etc., and are simple inexpensive elements. The means for circulating the fluid under pressure to and from the chambers 47 and 48 does not materially complicate the valve as the tubular webs 48 provide a practical means for carrying fluid under pressure to and from the interior of the plug. The geared connection between the plug 12 and the valve gear is particularly effective, as it is positive and simple in operation. None of the working parts are exposed to the fluid passing through the fluid passage P. The pinion shaft 70 is enclosed in the tubular web 71, and is the only moving part extending through the walls of the body 10.

Having described only a typical preferred form of the invention, I do not wish to limit myself to the specific details set forth, but wish to reserve to myself any changes or variations that may appear to those skilled in the art or fall within the scope of the following claims:

Having described my invention, I claim:

1. A valve of the character described, including a tubular body having an internal valve seat, a plug in the body operable into and out of cooperation with the seat, the plug having an internal cylindrical portion, a plurality of spaced guides on the interior of the body carrying the plug for movement into and out of cooperation with the seat, said spaced guides being operable to slidably guide the plug when it is in and adjacent the fully opened position, and means for operating the plug including, a stationary piston dividing the cylindrical portion into two chambers, and means for circulating fluid under pressure to and from the said chambers.

2. A valve of the character described, including, a tubular body having an internal valve seat, a plug in the body, a plurality of spaced guides on the interior of the body for guiding the plug into and out of cooperation with the seat, said guides being longitudinally spaced throughout their lengths and being operable to slidably guide the plug when it is in the fully opened position, the plug having an internal cylindrical portion, and means for operating the plug including, a stationary piston dividing the cylindrical portion into two chambers, conduits for circulating fluid under pressure to and from the chambers, and means for controlling the passage of fluid through the conduits.

3. A valve of the character described, including, a tubular body having an internal valve seat, a plug in the body, spaced guides on the interior of the body for guiding the plug into and out of cooperation with the seat, said spaced guides being operable to slidably guide the plug when it is in and adjacent the fully opened position, the plug having an internal cylindrical portion, and means for operating the plug including, a stationary piston dividing the cylindrical portion into two chambers, conduits for circulating fluid under pressure to and from the chambers, and a valve for controlling the flow of fluid through the conduits.

4. A valve of the character described, including, a tubular body having an internal valve seat, a plug in the body, spaced guides on the interior of the body for guiding the plug into and out of cooperation with the seat, said spaced guides being operable to slidably guide the plug when it is in and adjacent the fully opened position, the plug having an internal cylindrical portion, and means for operating the plug, including, a stationary piston dividing the cylindrical portion into two chambers, conduits for circulating fluid under pressure to and from the chambers, and means operatively connected with the plug for controlling the passage of fluid through the conduits.

5. A valve of the character described, including, a tubular body having an internal valve seat, a plug in the body, spaced guides on the interior of the body for slidably guiding the plug into and out of cooperation with the seat, said spaced guides being operable to slidably guide the plug when it is in and adjacent the fully opened position, the plug having an internal cylindrical portion, and means for operating the plug including, a stationary piston dividing the cylindrical portion into two chambers, conduits for circulating fluid under pressure to and from the chambers, a valve for controlling the flow of fluid through the conduits, valve gear for operating the valve, and an operative connection between the plug and valve gear.

6. A valve of the character described, including, a tubular body having an internal valve seat, a plug in the body, spaced guides on the interior of the body for slidably guiding the plug into and out of cooperation with the seat, said spaced guides being operable to slidably guide the plug when it is in and adjacent the fully opened position, the plug having an internal cylindrical portion, and means for operating the plug including, a stationary piston dividing the cylindrical portion into two chambers, conduits for circulating fluid under pressure to and from the chambers, a valve for controlling the flow of fluid through the conduits, valve gear for operating the valve, and a geared operative connection between the plug and valve gear.

7. A valve of the character described including, a body having a fluid passage, a hollow plug movable longitudinally in the passage and operable to control the flow through the passage, a stationary piston dividing the interior of the plug into two chambers, means for circulating fluid under pressure to and from the chambers to cause movement of the plug, and means for guiding the plug including spaced longitudinal guides on the interior of the body slidably engaging the plug, said guides slidably guiding the plug when in and adjacent the fully open position.

8. A valve of the character described including, a body having a fluid passage, a hollow plug movable longitudinally in the passage and operable to control the flow through the passage, a stationary piston dividing the interior of the plug into two chambers, means for circulating fluid under pressure to and from the chambers to cause movement of the plug, said means including a tubular stem carrying the piston and a tubular partition in the stem dividing its opening into two passages, one passage communicating with one chamber, the other passage communicating with the other chamber, a rod connected to the plug and extending longitudinally through the partition, valve means controlling the flow through the passages, and an operative connection between the rod and the valve means.

9. A valve of the character described including, a body having a fluid passage, a hollow plug movable longitudinally in the passage and operable to control the flow through the passage, a stationary piston dividing the interior of the plug into two chambers, means for circulating fluid under pressure to and from the chambers to cause movement of the plug, said means including a tubular stem extending into the plug, a longitudinal tube in the stem dividing its opening into two passages, one passage communicating with one chamber and the other passage communicating with the other chamber, and tubular webs projecting into the passage and carrying the stem, the interiors of the webs communicating directly with the said passages, and means for guiding the plug.

10. A valve of the character described including, a body having a fluid passage, a hollow plug movable longitudinally in the passage and operable to control the flow through the passage, a stationary piston dividing the interior of the plug into two chambers, means for circulating fluid under pressure to and from the chambers to cause movement of the plug, said means including a tubular stem extending into the plug and carrying the piston, a tube extending longitudinally through the stem dividing the interior of the stem into two concentric passages, one passage communicating with one chamber, the other passage communicating with the other chamber, webs carrying the stem and having fluid openings communicating with said fluid passages and extending to the exterior of the body, and valve means controlling the flow through said fluid openings.

11. A valve including, a body having a fluid passage, a hollow plug movable in the passage to control the flow therethrough, spaced longitudinal guides projecting from the interior of the body and slidably guiding the plug, said guides being sufficiently long to slidably guide the plug during its stroke between the fully open position and the closed position, a stationary piston dividing the interior of the plug into two chambers, means for passing fluid under pressure into one chamber while discharging it from the other chamber to cause operation of the plug, a valve controlling the said means, and manual means for operating said valve.

12. A valve including, a body having a fluid passage, a hollow plug movable in the passage to control the flow therethrough, a stationary piston dividing the interior of the plug into two chambers, means for passing fluid under pressure into one chamber while discharging it from the other chamber to cause operation of the plug, a valve remote from the plug for controlling the said means, means for manually operating said valve, and an operative connection between the said valve and plug whereby said valve is closed upon pre-determined operation of the plug.

13. A valve including, a body having a fluid passage, a hollow plug movable in the passage to control the flow therethrough, a stationary piston dividing the interior of the plug into two chambers, means for passing fluid under pressure into one chamber while discharging it from the other chamber to cause operation of the plug, a valve controlling the said means, means for manually operating said valve, and an operative rack and pinion connection between the said valve and plug whereby said valve is closed upon pre-determined operation of the plug.

14. A valve including, a body having a fluid passage, a hollow plug movable in the passage to control the flow therethrough, a stationary piston dividing the interior of the plug into two chambers, means for passing fluid under pressure into one chamber while discharging it from the other chamber to cause operation of the plug, a valve controlling the said means, means for manually operating said valve, and an operative connection between the said valve and plug whereby said valve is closed upon pre-determined operation of the plug, said connection including a rack carried by the plug, a rack at the exterior of the body, a drive between the racks, and a connection between the last named rack and the last mentioned means.

15. A valve including, a body having a fluid passage, a hollow plug movable in the passage to control the flow therethrough, a stationary piston dividing the interior of the plug into two chambers, means for passing fluid under pressure into one chamber while discharging it from the other chamber to cause operation of the plug, a valve controlling the said means, means for manually operating said valve, and an operative connection between said valve and plug whereby said valve is closed upon pre-determined operation of the plug, said connection including a web extending into the fluid passage and having an opening, a shaft extending through said opening, a rack and pinion drive between the plug and shaft, and means at the exterior of the body connecting the shaft and the last mentioned means.

16. A valve including, a body having a fluid passage, a hollow plug movable in the passage to control the flow therethrough, a stationary piston dividing the interior of the plug into two chambers, means for passing fluid under pressure into one chamber while discharging it from the other chamber to cause operation of the plug, a valve controlling the said means, means for manually operating said valve including a manually rotatable shaft, a travelling nut on the shaft, a floating lever connected with the nut, and a rod connecting the lever with the valve, the nut being operable to shift the lever and rod to operate the valve, and an operative connection between the plug and floating lever operable to return the rod to dead position upon the plug moving a predetermined distance.

17. A valve of the character described including, a tubular body having an internal valve seat, a stream lined plug in the body operable into and out of cooperation with the seat, the plug having an internal cylindrical portion, spaced guides on the interior of the body guiding the plug, the guides slidably guiding the plug between the closed position and the full open position, and means for operating the plug including, a stationary piston dividing the cylindrical portion into two chambers, and means for circulating fluid under pressure to and from the said chambers.

18. A valve of the character described including, a tubular body having an internal valve seat, a hollow plug movable longitudinally in the body and adapted to cooperate with the seat, the opposite ends of the plug being stream-lined, there being an opening in the inner end of the plug, a web projecting into the body, a tubular rod carried by the web and passing through said opening, a stationary piston on the rod dividing the interior of the plug into chambers, there being fluid passages in the web and rod communicating with the two chambers, and means for circulating fluid pressure through the passages to and from the chamber to move the plug.

19. A valve of the character described including, a tubular body having an internal valve seat, a hollow plug movable longitudinally in the body and adapted to cooperate with the seat, the opposite ends of the plug being streamlined, there being an opening in the inner end of the plug, a web projecting into the body, a tubular rod carried by the web and passing through said opening, a stationary piston on the rod dividing the interior of the plug into two chambers, a tubular partition dividing the interior of the rod into two concentric longitudinal passages, one passage communicating with one chamber, the other passage communicating with the other chamber, fluid passages in the web connecting with said passages in the rod, means for circulating fluid pressure through the passages to operate the plug, a stem attached to the plug and extending longitudinally through the innermost passage of the rod, and manual means for operating the stem.

20. A valve of the character described including, a tubular body having an internal valve seat, a hollow plug movable longitudinally in the body and adapted to cooperate with the seat, the opposite ends of the plug being stream-lined, there being an opening in the inner end of the plug, a web projecting into the body, a tubular rod carried by the web and slidable passing through said opening to support the plug for longitudinal movement, means independent of the rod for guiding the plug, a stationary piston on the rod dividing the interior of the plug into two chambers, there being two longitudinal passages in the rod, one passage communicating with one chamber, the other passage communicating with the other chamber, the web having ports connecting with the passages, and means for circulating fluid under pressure through the ports and passages to operate the plug.

JAMES A. THOMAS.